(12) United States Patent
Kudo

(10) Patent No.: US 11,988,529 B2
(45) Date of Patent: May 21, 2024

(54) COUNTER UNIT, DATA PROCESSING DEVICE, MEASUREMENT SYSTEM, COUNTER UNIT CONTROL METHOD, AND DATA PROCESSING METHOD

(71) Applicant: OMRON Corporation, Kyoto (JP)

(72) Inventor: Masaya Kudo, Osaka (JP)

(73) Assignee: OMRON Corporation, Kyoto (JP)

( * ) Notice: Subject to any disclaimer, the term of this patent is extended or adjusted under 35 U.S.C. 154(b) by 441 days.

(21) Appl. No.: 17/605,237

(22) PCT Filed: Mar. 10, 2020

(86) PCT No.: PCT/JP2020/010265
§ 371 (c)(1),
(2) Date: Oct. 21, 2021

(87) PCT Pub. No.: WO2020/230429
PCT Pub. Date: Nov. 19, 2020

(65) Prior Publication Data
US 2022/0196440 A1 Jun. 23, 2022

(30) Foreign Application Priority Data
May 10, 2019 (JP) ................... 2019-090133

(51) Int. Cl.
*G01D 5/244* (2006.01)
*G01D 21/02* (2006.01)
*H04Q 9/00* (2006.01)

(52) U.S. Cl.
CPC ............. *G01D 5/244* (2013.01); *G01D 21/02* (2013.01); *H04Q 9/00* (2013.01)

(58) Field of Classification Search
CPC ........... G01D 5/244; G01D 21/02; H04Q 9/00
See application file for complete search history.

(56) References Cited

U.S. PATENT DOCUMENTS

| 6,118,387 A | 9/2000 | Hagiwara et al. |
| 6,504,876 B1 * | 1/2003 | Suto ........................ G06F 13/24 |
| | | 307/106 |
| 2015/0078405 A1 | 3/2015 | Roberts |

FOREIGN PATENT DOCUMENTS

| CN | 1033721 | 7/1989 |
| CN | 101334672 | 12/2008 |

(Continued)

OTHER PUBLICATIONS

"International Search Report (Form PCT/ISA/210) of PCT/JP2020/010265," dated Jun. 9, 2020, with English translation thereof, pp. 1-4.

(Continued)

*Primary Examiner* — Peter J Macchiarolo
*Assistant Examiner* — John M Royston
(74) *Attorney, Agent, or Firm* — JCIPRNET

(57) ABSTRACT

When counting a pulse signal, in order that the communication load and data processing load be suppressed and measurement accuracy be maintained, a counter unit (2) comprises: a measurement unit (21) which counts the number of pulses of a pulse signal, and thus measures an actual value; a comparison unit (22) which determines if the actual value and a target value match; a time information processing unit (23) which, if there is a match, sets the time of the actual value as target time information; and an output unit (24) which outputs the target time information, in a prescribed communication cycle, to an external device.

20 Claims, 6 Drawing Sheets

(56) References Cited

FOREIGN PATENT DOCUMENTS

| | | |
|---|---|---|
| CN | 105008934 | 10/2015 |
| CN | 107696029 | 2/2018 |
| JP | H03293520 | 12/1991 |
| JP | H0740522 | 2/1995 |
| JP | 2001194197 | 7/2001 |
| JP | 2018024044 | 2/2018 |
| JP | 2018024045 | 2/2018 |
| JP | 2019152967 | 9/2019 |
| WO | 2018008102 | 1/2018 |

OTHER PUBLICATIONS

"Written Opinion of the International Searching Authority (Form PCT/ISA/237) of PCT/ JP2020/010265," dated Jun. 9, 2020, with English translation thereof, pp. 1-8.

"Office Action of China Counterpart Application", dated Dec. 5, 2023, with English translation thereof, p. 1-p. 11.

"Search Report of Europe Counterpart Application", dated Jan. 9, 2023, p. 1-p. 5.

\* cited by examiner (a)

Output of counter unit

| Horizontal position(mm) | Arrival time |
|---|---|
| 0 | 0 |
| 5 | 10 |
| 10 | 20 |
| 15 | 30 |
| 20 | 40 |
| 30 | 60 |
| 40 | 80 |
| 50 | 100 |

Output of analog input unit

| Equally-spaced time | Vertical position(mm) |
|---|---|
| 0 | 0 |
| 10 | 10 |
| 20 | 20 |
| 30 | 30 |
| 40 | 40 |
| 50 | 42.5 |
| 60 | 45 |
| 70 | 47.5 |
| 80 | 50 |
| 90 | 52.5 |
| 100 | 55 |

(b)

Combination of measured results

| Horizontal position (mm) | Vertical position (mm) |
|---|---|
| 0 | 0 |
| 5 | 10 |
| 10 | 20 |
| 15 | 30 |
| 20 | 40 |
| 30 | 45 |
| 40 | 50 |
| 50 | 55 |

(c)

(a)

| Storage number |
|---|
| Target value leading number |
| Coincidence time |
| Coincidence time |
| Coincidence time |
| Coincidence time |
| Coincidence time |

(b)

| Storage number |
|---|
| Target value leading position |
| Coincidence time |
| Coincidence time |
| Coincidence time |
| Coincidence time |
| Coincidence time |

(c)

| Storage number |
|---|
| Target value |
| Coincidence time |
| Target value |
| Coincidence time |
| Target value |
| Coincidence time |
| Target value |
| Coincidence time |
| Target value |
| Coincidence time |

FIG. 5

COUNTER UNIT, DATA PROCESSING DEVICE, MEASUREMENT SYSTEM, COUNTER UNIT CONTROL METHOD, AND DATA PROCESSING METHOD

CROSS-REFERENCE TO RELATED APPLICATION

This application is a 371 application of the International PCT application serial no. PCT/JP2020/010265, filed on Mar. 10, 2020, which claims the priority benefits of Japan Patent Application No. 2019-090133, filed on May 10, 2019. The entirety of each of the above-mentioned patent applications is hereby incorporated by reference herein and made a part of this specification.

TECHNICAL FIELD

The present invention relates to a counter unit that counts pulse signals and the like.

BACKGROUND ART

As a conventional technology, a high-speed counter unit that counts pulse signals output from an encoder or the like and transmits a result of the counting to a programmable logic controller (PLC) is known. Such a high-speed counter unit can count pulses in a period shorter than a control period.

CITATION LIST

Patent Literature

[Patent Literature 1]
Japanese Patent Application Laid-Open No. 2018-024044
[Patent Literature 2]
Japanese Patent Application Laid-Open No. H7-040522

SUMMARY OF INVENTION

Technical Problem

However, transmission of a counter current value to a PLC is performed for every control period, and the resolution may be insufficient for uses such as shape measurement and the like.

Recently, in order to secure resolution, products in which an over-sampling function is installed have appeared. In such an over-sampling function, after current counter values have accumulated in a buffer in a period shorter than a control period, later, the counter values can then be transmitted from the buffer to a PLC altogether. In this case, the counter current positions are acquired at predetermined time intervals. For this reason, there is a characteristic that the granularity of the amount of change of the counter current position changes in accordance with the speed of pulses. Here, the time interval can be set by a user.

In uses for shape measurement and the like, the amount of change of the current position becomes the granularity of an inspection, and thus a sampling period is determined in accordance with the necessary accuracy. However, in a case in which the sampling period is randomly shortened, the amount of data increases, and there is a problem in that a communication load and a data processing load increase.

In addition, there is a demand for desiring to change the accuracy in accordance with the portion of an inspection target, and there may be nonuniformity in the movement speed of the inspection target, and thus there is a problem in that it may be difficult to determine an optimal sampling period. For example, when the sampling period is determined in accordance with a part for which granularity is necessary, redundant data is acquired from a part for which such granularity is not necessary.

In Patent Literature 1, a technology for enabling a counter to transmit a plurality of measured amounts of movement and a measurement timing of each amount of movement has been disclosed. In addition, in Patent Literature 2, a technology for counting output pulses of an encoder and outputting a signal at a time point at which a target value is matched has been disclosed. However, none of this patent literature solves the problems described above.

An objective of one aspect of the present invention is to reduce a communication load and a data processing load in a case in which pulse signals are counted and maintain measurement accuracy even when the movement speed of a measurement target changes.

Solution to Problem

In order to solve the problems described above, according to one aspect of the present invention, there is provided a counter unit including: a measurement unit configured to measure an actually-measured value by counting a number of pulses of a pulse signal; a comparison unit configured to determine coincidence between the actually-measured value measured by the measurement unit and a target value; a time information processing unit configured to store a time corresponding to the actually-measured value in a buffer as target time information when the comparison unit determines that the actually-measured value and the target value coincide with each other; and an output unit configured to output a plurality of pieces of target time information stored in the buffer to an external device through communication with a predetermined communication period.

According to one aspect of the present invention, there is provided a counter unit control method including: a measuring step of measuring an actually-measured value by counting a number of pulses of a pulse signal; a comparing step of determining coincidence between the actually-measured value measured by the measuring step and a target value; a time information processing step of storing a time corresponding to the actually-measured value in a buffer as target time information when it is determined by the comparing step that the actually-measured value and the target value coincide with each other; and an output step of outputting a plurality of pieces of target time information stored in the buffer to an external device through communication with a predetermined communication period.

According to one aspect of the present invention, there is provided a data processing method including: a time information receiving step of receiving the target time information from the counter unit described above; a measured value acquiring step of acquiring a measured value and measurement time information from a predetermined measurement device; and a measured value identifying step of identifying a measured value having the measurement time information that is within a predetermined range for a time represented by the target time information.

Advantageous Effects of Invention

According to one aspect of the present invention, a communication load and a data processing load can be reduced in a case in which pulse signals are counted, and measurement accuracy can be maintained even when the movement speed of a measurement target changes.

BRIEF DESCRIPTION OF DRAWINGS

FIG. 5 is a diagram illustrating an example of the configuration of transmission data from a counter unit to a PLC according to Embodiment 1 of the present invention.

Description of Embodiments

Embodiment 1

Figure 1:
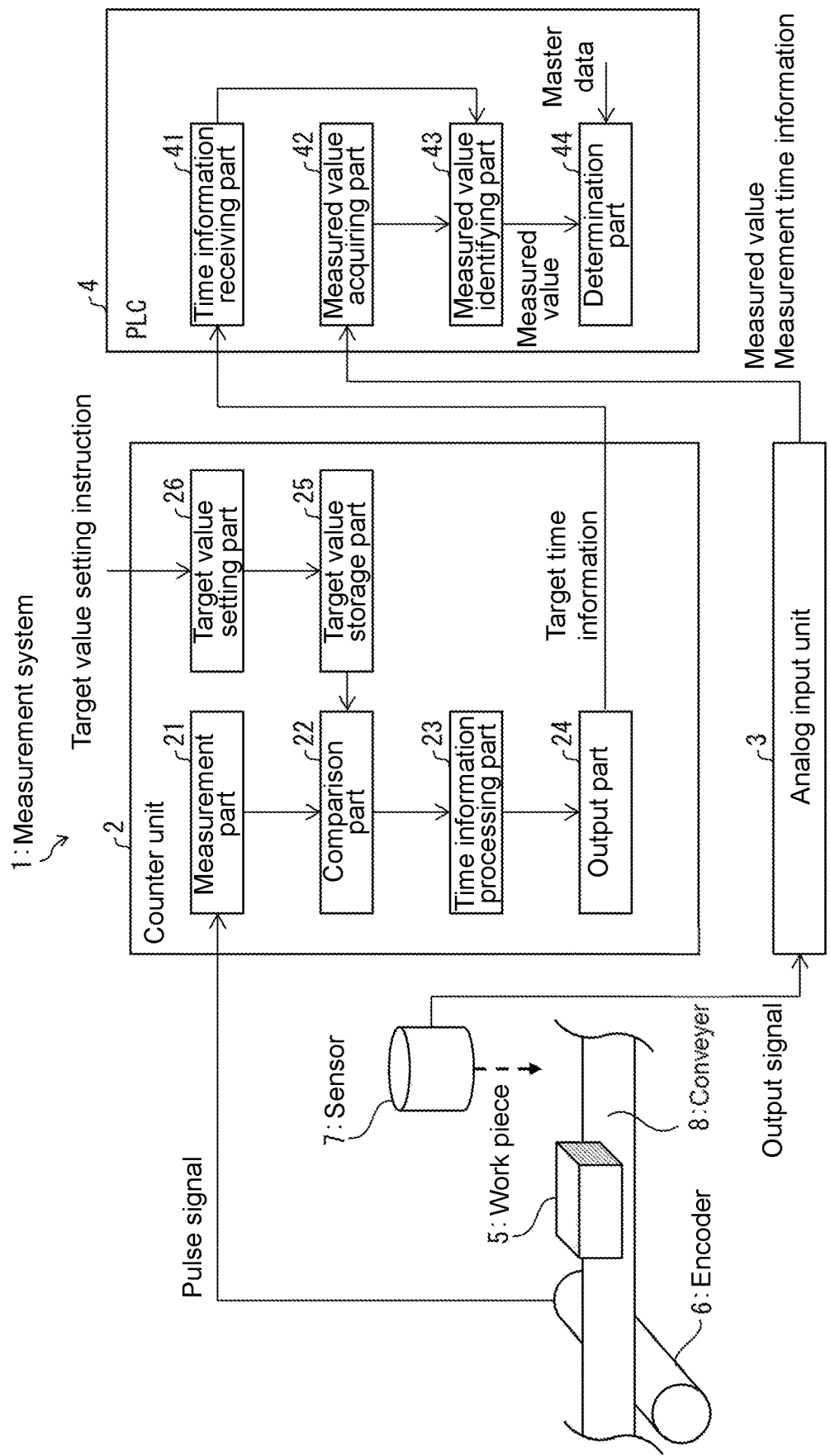
FIG. 1 is a block diagram illustrating the configuration of a measurement system according to Embodiment 1 of the present invention.

Hereinafter, an embodiment according to one aspect of the present invention (hereinafter, also referred to as "this embodiment") will be described with reference to FIGS. 1 to 6. In the drawings, the same reference signs are assigned to the same parts or parts corresponding to each other, and description thereof will not be repeated. In this embodiment, for example, a counter unit 2 will be described as a typical example of a counter unit. In order to allow easy understanding of the counter unit 2 according to one aspect of the present invention, first, an overview of a measurement system 1 including the counter unit 2 will be described with reference to FIG. 1.

1. Application Example
(Entire Configuration of Measurement System 1)

FIG. 1 is a block diagram illustrating the configuration of the measurement system 1 according to this embodiment. As illustrated in FIG. 1, in the measurement system 1, while a conveyer 8 moves a work piece 5 that is a target of which a shape is to be measured, an encoder 6 detects a position of the work piece 5 in a horizontal direction, and a sensor (measurement device) 7 detects a position of the work piece 5 in a vertical direction.

The measurement system 1 includes a counter unit 2, an analog input unit 3, and a PLC (data processing device) 4. The counter unit 2 counts pulse signals output by the encoder 6 and transmits target time information to the PLC 4. The analog input unit 3 transmits an output signal from the sensor 7 to the PLC 4 as a measured value together with measurement time information. The PLC 4 acquires target time information from the counter unit 2, acquires the measured value and the measurement time information from the analog input unit 3, and then inspects the shape of the work piece 5. In more detail, the PLC 4 determines the appropriateness/inappropriateness of the shape of the work piece 5 by comparing the shape of the measured work piece 5 with master data.

2. Configuration Example
(Configuration of Counter Unit 2)

As illustrated in FIG. 1, the counter unit 2 includes a measurement unit 21, a comparison unit 22, a time information processing unit 23, an output unit 24, a target value storage unit 25, and a target value setting unit 26. The measurement unit 21 measures an actually-measured value by counting the number of pulses of a pulse signal output from the encoder 6. The comparison unit 22 determines coincidence between an actually-measured value measured by the measurement unit 21 and a target value. In a case in which the comparison unit 22 determines that the actually-measured value and the target value coincide with each other, the time information processing unit 23 stores a time corresponding to the actually-measured value in a buffer as target time information. The output unit 24 outputs multiple pieces of target time information stored in the buffer to the PLC (an external device) 4 through communication with a predetermined communication period.

The target value storage unit 25 stores a list of target values. In accordance with this, the comparison unit 22 may determine coincidence between the actually-measured value and the target value by referring to the target value storage unit 25. Here, the comparison unit 22 may determine coincidence between the actually-measured value and a target value set at predetermined intervals.

The target value setting unit 26 accepts a target value setting instruction from a user. The target value setting instruction, for example, may be configured to be accepted from a setting value input device such as a notebook PC through a universal serial bus (USB) or may be configured to be accepted from a PLC 4 to which a setting value input device is connected via a communication network.

A method of designating a target value is not particularly limited. For example, multiple target positions may be aligned in a table (for example, 0, 5, 10, 20, . . . etc.). In addition, a start position, an end position, and the number of divisions may be designated (with a pitch of 10 from 0 to 1000). Furthermore, only the amount of change may be designated (+10 or the like).

(Configuration of PLC 4)

The PLC 4 is an industrial controller and controls a device that is a control target. A control unit of the PLC 4 may be connected to the counter unit 2 and the analog input unit 3 through a bus or may be connected thereto using EtherCAT (a registered trademark), EtherNet/IP (a registered trademark), DeviceNet (a registered trademark), CompoNet (a registered trademark), or the like through a communication coupler.

As illustrated in FIG. 1, the PLC (a data processing device) 4 includes a time information receiving unit 41, a measured value acquiring unit 42, a measured value identifying unit 43, and a determination unit 44. The time information receiving unit 41 receives target time information from the counter unit 2. The measured value acquiring unit 42 acquires a measured value and measurement time information acquired by the sensor (a predetermined measurement device) 7. The measured value identifying unit 43 identifies a measured value having measurement time information within a predetermined range for a time indicated by the target time information. The determination unit 44 determines whether or not a difference between master data representing a correct answer value of the measured value and the measured value identified by the measured value identifying unit 43 is within an allowed range.

(Example of Master Data)

Figure 2:
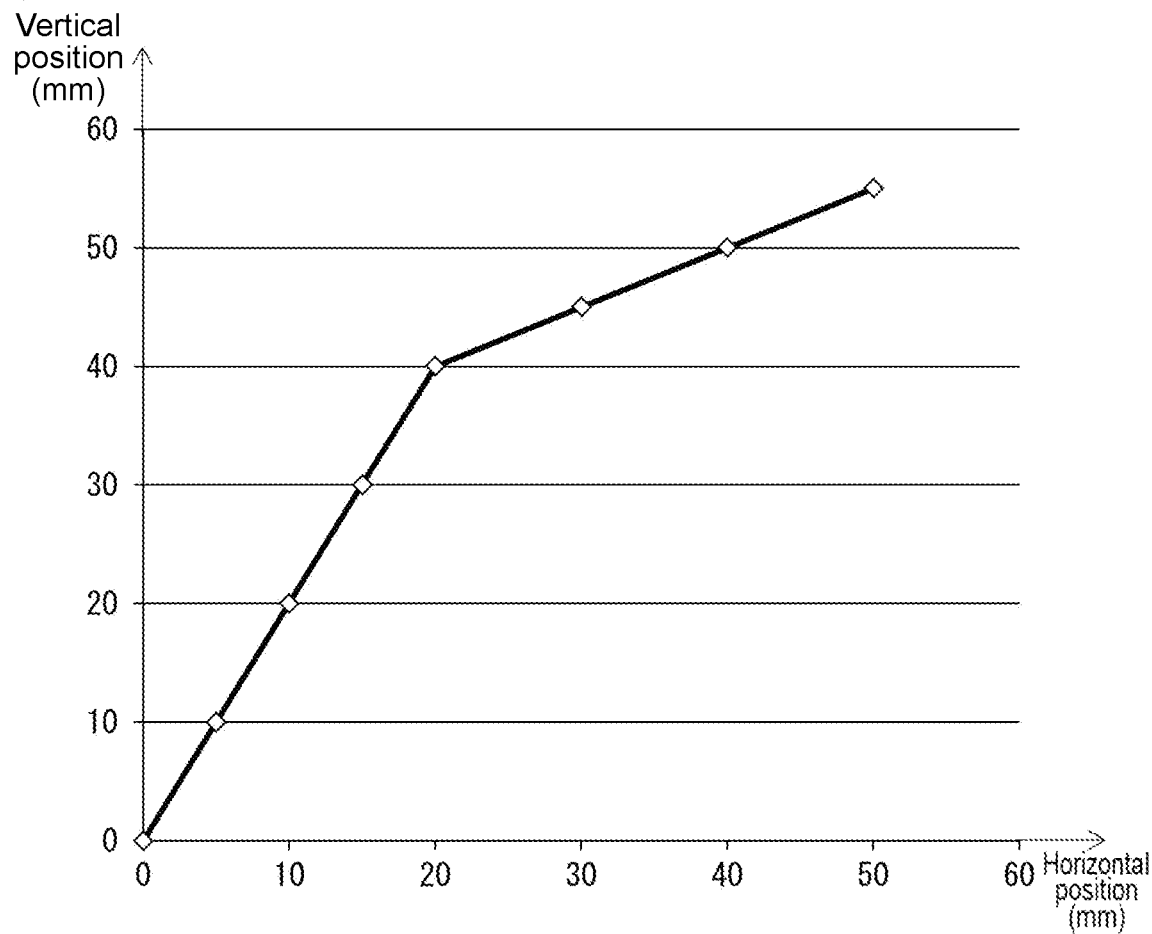
FIG. 2 is a diagram illustrating an example of master data representing the shape of a work piece according to Embodiment 1 of the present invention.

FIG. 2 is a diagram illustrating an example of master data representing the shape of a work piece 5 according to this embodiment. (a) of FIG. 2 is an example in which master data is represented in a table form. (b) of FIG. 2 is an example in which master data is represented in a graph form. As illustrated in (a) and (b) of FIG. 2, the master data is composed of numerical data representing a horizontal position (mm) and a vertical position (mm) that are associated with each other.

(Example of Measurement Result)

Figure 3:
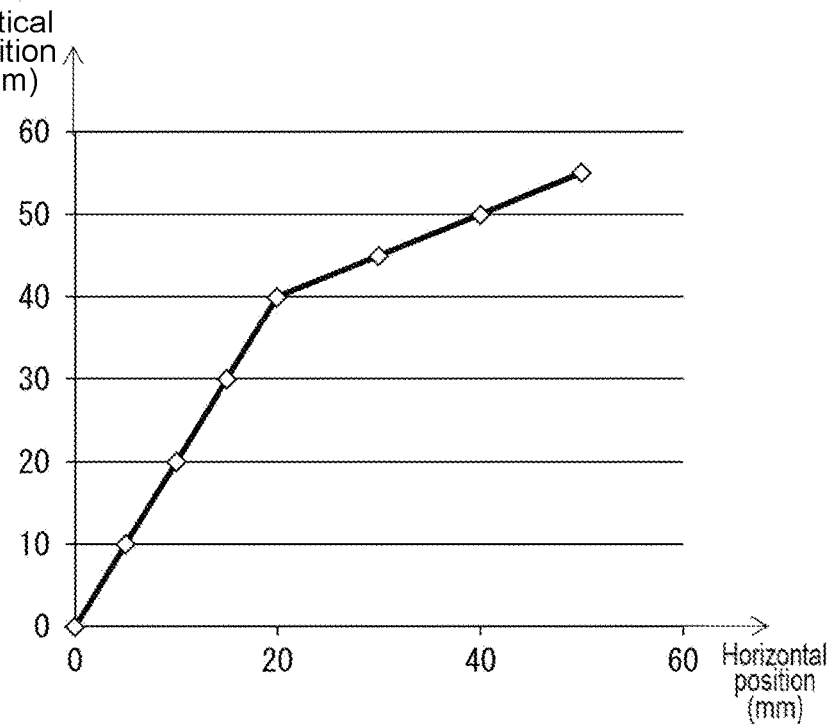
FIG. 3 is a diagram illustrating an example of a result of measurement of the shape of a work piece according to Embodiment 1 of the present invention.

FIG. 3 is a diagram illustrating an example of results of measurement (hereinafter, referred to as "measurement results") of the shape of the work piece 5 according to this embodiment. (a) of FIG. 3 is an example in which two measurement results are represented in a table form. (b) of FIG. 3 is an example in which a combination of measurement results is represented in a graph form. (c) of FIG. 3 is an example in which a combination of measurement results is represented in a graph form.

The counter unit 2 identifies a time of arrival at a horizontal position designated by a user (hereinafter, referred to as an "arrival time") and outputs the identified time to the PLC 4. The analog input unit 3 outputs a vertical position (one of equally-spaced times and a vertical position) at each predetermined time interval to the PLC 4.

The PLC 4 searches equally-spaced times acquired from the analog input unit 3 using the arrival time acquired from the counter unit 2 as a key and acquires combination data that is a combination of a horizontal position and a vertical position at times that are close to each other.

As denoted by arrows illustrated in (a) of FIG. 3, an arrival time output by the counter unit 2 and one of equally-spaced times that is a time for each predetermined time interval in the analog input unit 3 are associated with each other. (b) and (c) of FIG. 3 illustrate combination data acquired by combining a horizontal position corresponding to an arrival time and a vertical position corresponding to one of equally-spaced times in a case in which the arrival time and the equally-spaced time are associated with each other.

Then, the PLC 4 compares the combination data with master data.

According to the description presented above, in regards to a horizontal position, points for a shape inspection can be directly designated, and thus the operation is simple, and redundant data does not need to be acquired. Further, an amount of acquired data becomes a necessary minimum, and thus a communication load and a data processing load can be reduced. Even when movement of the work piece 5 in the horizontal direction according to the conveyer 8 is accelerated/decelerated, or there is unevenness in the movement speed, there is no influence on the inspection accuracy for the horizontal position. In addition, the vertical position is acquired for each sampling period of the analog input unit 3.

(Process of Counter Unit 2)

Figure 4:
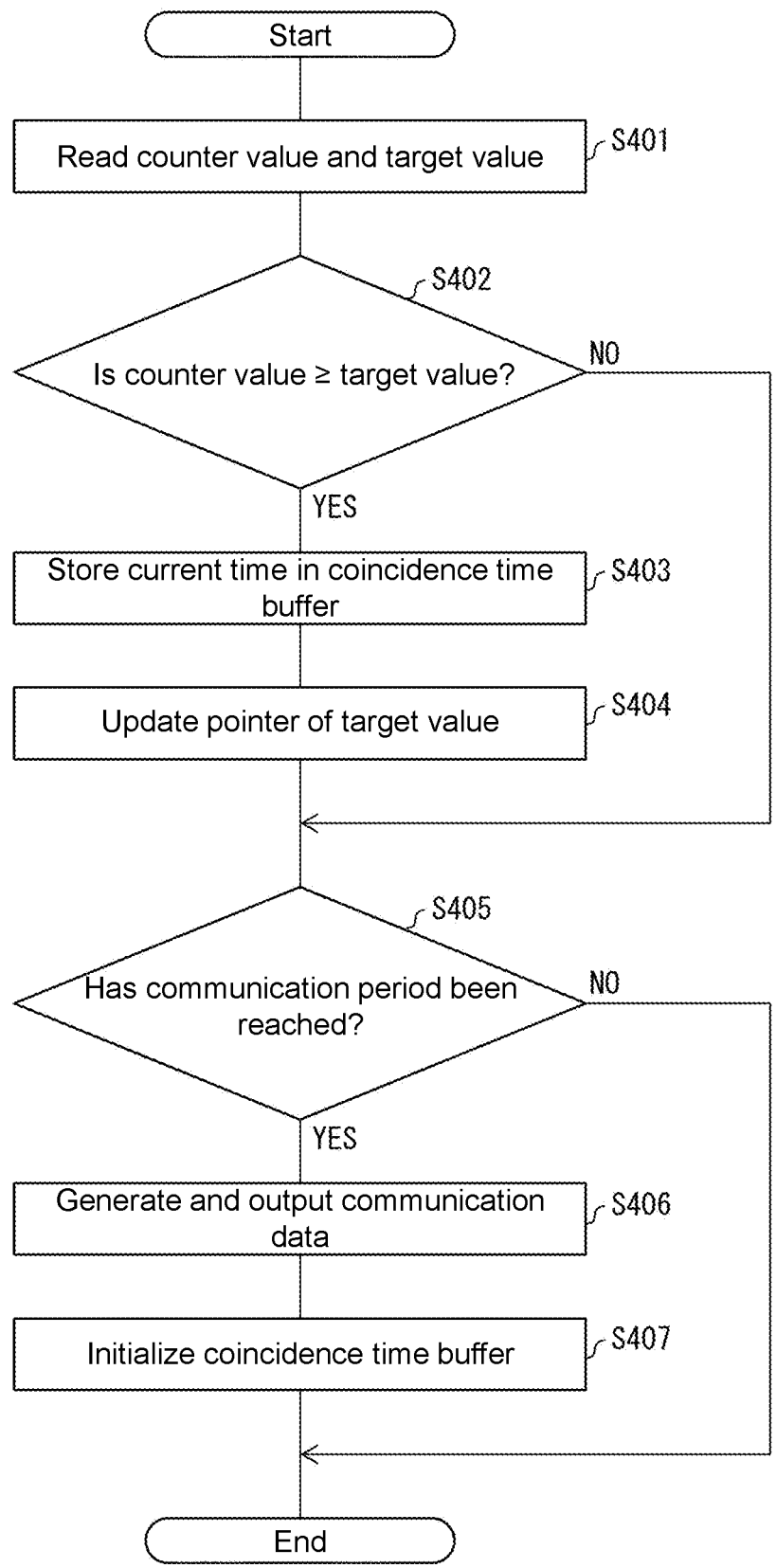
FIG. 4 is a flowchart illustrating an example of the process of a counter unit according to Embodiment 1 of the present invention.

FIG. 4 is a flowchart illustrating an example of the process of the counter unit 2 according to this embodiment. This process may be started for each sampling period of data output from the encoder 6 or may be started in accordance with an interrupt triggered upon detection of "counting value=target value" in the comparator. In the case of the interrupt of the comparator, the process is started from Step S403 illustrated in FIG. 4.

First, in the counter unit 2, the measurement unit 21 counts the number of pulses of a pulse signal output by the encoder 6 and measures a counting value (an actually-measured value) (measuring step). Then, the counter unit 2 performs the following processes at the timings stated above.

(Step S401)

In the counter unit 2, the comparison unit 22 reads a counting value from the measurement unit 21. Then, the comparison unit 22 reads a target value from the target value storage unit 25 in accordance with a pointer. The pointer indicates a target value to be compared with the counting value next among multiple target values or a storage position of the target value.

(Step S402: Comparing Step)

The comparison unit 22 determines whether or not the counting value read in Step S401 is equal to or larger than a target value. In a case in which the counting value is equal to or larger than the target value (Yes in Step S402), the counter unit 2 performs processes of Steps S403 and S404. In a case in which the counting value is not equal to or larger than the target value (is smaller than the target value) (No in Step S402), the counter unit 2 skips the processes of Steps S403 and S404 and performs determination of Step S405.

(Step S403: Time Information Processing Step)

The time information processing unit 23 stores a time corresponding to the counting value that is equal to or larger than the target value in a coincidence time buffer as target time information. In the coincidence time buffer, times (target time information) corresponding to counting values that are equal to or larger than each target value are sequentially stored.

(Step S404)

The counter unit 2 updates a pointer (for example, an address on a memory or the like) in a case in which a target value is read.

(Step S405)

The counter unit 2 determines whether or not a communication period has been reached. The communication period is a period corresponding to the control period of the PLC 4 and represents a time interval for transmitting data from the counter unit 2 to the PLC 4. In a case in which the communication period has been reached (Yes in Step S405), the counter unit 2 performs processes of Steps S406 and S407. In a case in which the communication period has not been reached (No in Step S405), the counter unit 2 skips the processes of Step S406 and S407 and ends the process.

(Step S406: Output Step)

In the counter unit 2, the output unit 24 generates transmission data from multiple pieces of target time information stored in the coincidence time buffer and outputs the transmission data to the PLC 4 through communication.

(Step S407)

The counter unit 2 initializes the coincidence time buffer.

FIG. 5 is a diagram illustrating an example of the configuration of transmission data from the counter unit 2 to the PLC 4 according to this embodiment. As methods for representing a target value for transmission data, there are multiple options.

In a case in which target values are registered in a table, as illustrated in (a) of FIG. 5, a method in which the counter unit 2 adds a target value leading number of the table may be selected. In more detail, the transmission data includes a storage number, a target value leading number, and multiple coincidence times. The storage number represents the number of coincidence times stored in the coincidence buffer (hereinafter, the same). The target value leading number represents a number of a target value corresponding to a leading coincidence time among target values stored in the table. In the description presented above, only the target value leading number is added to the target value, and thus the amount of transmission data can be reduced.

In a case in which target values are registered in a table, as illustrated in (b) of FIG. 5, a method in which the counter unit 2 adds a target value leading position of the table may be selected. In more detail, transmission data includes a storage number, a target value leading position, and multiple coincidence times. The target value leading position represents a position (horizontal position) of a target value corresponding to a leading coincidence time among target values stored in the table. According to the description presented above, only the target value leading position is added to the target values, and thus the transmission data can be reduced.

As illustrated in (c) of FIG. 5, a method in which the counter unit 2 adds all the target values may be selected. In more detail, transmission data includes a storage number and multiple combinations each including a target value and a coincidence time.

(Process of PLC 4)

Figure 6:
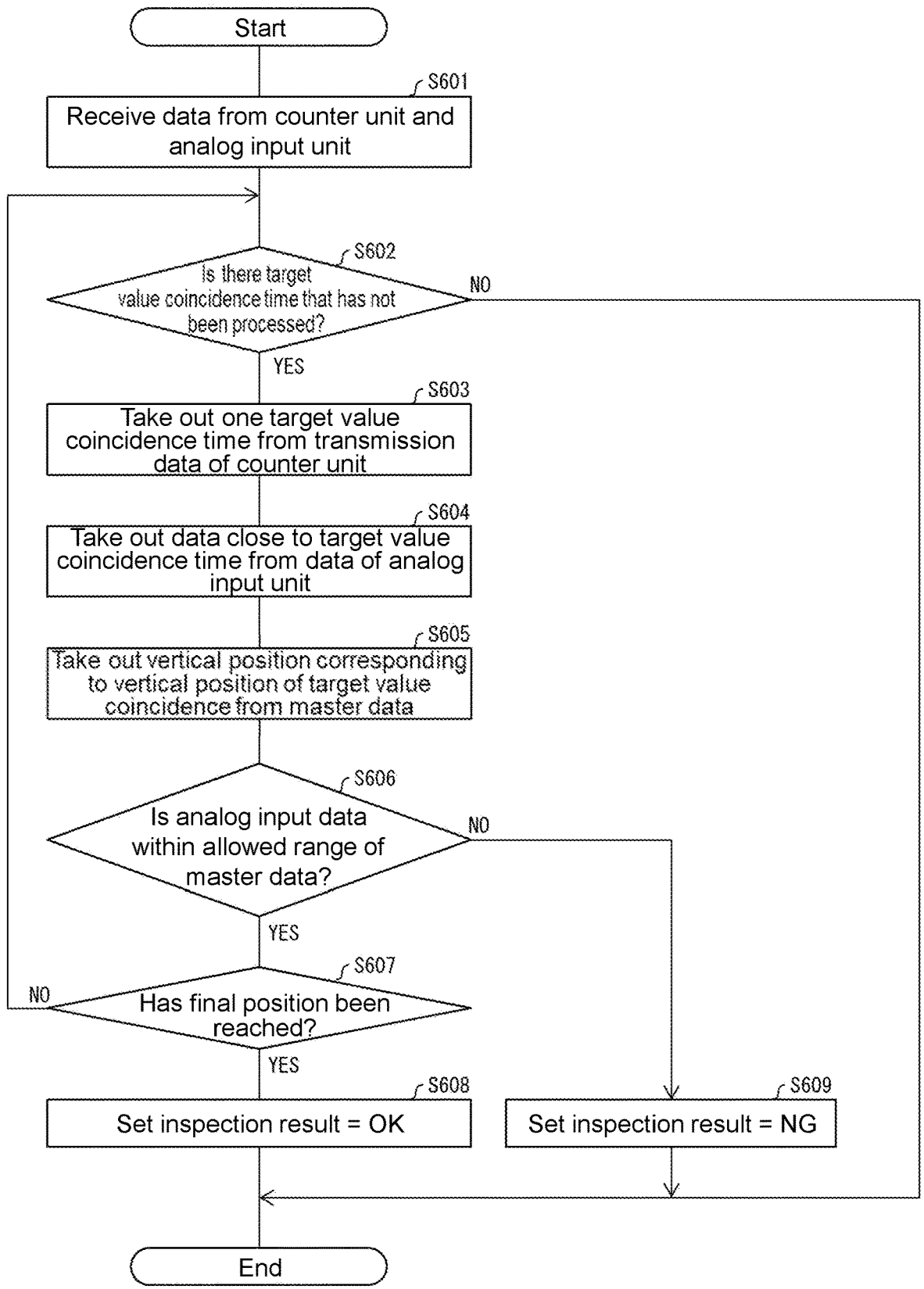
FIG. 6 is a flowchart illustrating an example of the process of a PLC according to Embodiment 1 of the present invention.

FIG. 6 is a flowchart illustrating an example of the process of the PLC 4 according to this embodiment. The process is performed for every communication period.

(Step S601: Time Information Receiving Step, Measured Value Acquiring Step)

In the PLC 4, the time information receiving unit 41 receives transmission data (target time information) from the counter unit 2. In addition, the measured value acquiring unit 42 acquires a measured value acquired using the sensor 7 and measurement time information from the analog input unit 3.

(Step S602)

The PLC 4 determines whether or not target value coincidence times (hereinafter, referred to as coincidence times), which have not been processed, are stored in the transmission data. In a case in which coincidence times, which have not been processed, are stored (Yes in Step S602), the PLC 4 performs processes of Step S603 and subsequent steps. In a case in which no coincidence time, which has not been processed is stored (No in Step S602), the PLC 4 skips processes of Step S603 and subsequent steps and ends the process.

(Step S603)

The PLC 4 takes out one combination of a first coincidence time and a horizontal position among coincidence times that have not been processed from the transmission data received from the counter unit 2.

(Step S604: Measured Value Identifying Step)

The PLC 4 takes out a vertical position of a time close to the coincidence time of Step S603 from the data received from the analog input unit 3. In other words, the measured value identifying unit 43 identifies a measured value having measurement time information within a predetermined range with respect to a time represented in the target time information.

(Step S605)

The PLC 4 takes out a vertical position corresponding to a horizontal position coinciding with the target value from the master data.

(Step S606)

The PLC 4 determines whether or not the vertical position of the analog input unit 3 is within an allowed range of the vertical position of the master data. In a case in which the vertical position is within the allowed range (Yes in Step S606), the PLC 4 performs determination of Step S607. In a case in which the vertical position is not within the allowed range (No in Step S606), the PLC 4 performs a process of Step S609.

(Step S607)

The PLC 4 determines whether or not the horizontal position reaches a final position. In a case in which the horizontal position has reached the final position (Yes in Step S607), the PLC 4 performs a process of Step S608. In a case in which the horizontal position has not reached the final position (No in Step S607), the PLC 4 performs the determination of Step S602 again.

(Step S608)

The PLC 4 sets an inspection result to OK. This represents that all the vertical positions that have been measured are within the allowed range of the master data. Then, the PLC 4 ends the process.

(Step S609)

The PLC 4 sets the inspection result to NG. This represents that at least one of vertical positions that have been measured is not within the allowed range of the master data. Then, the PLC 4 ends the process.

[Example of Realization Using Software]

Each of the functional blocks of the counter unit 2 and the PLC 4 (more specifically, the measurement unit 21, the comparison unit 22, the time information processing unit 23, the output unit 24, the target value storage unit 25, the target value setting unit 26, the time information receiving unit 41, the measured value acquiring unit 42, the measured value identifying unit 43, and the determination unit 44) may be realized by a logical circuit (hardware) formed in an integrated circuit (IC chip) or the like or may be realized by software.

In the latter case, each of the counter unit 2 and the PLC 4 includes a computer that executes commands of a program that is software realizing each function. This computer, for example, includes one or more processors and includes a computer-readable recording medium storing the program described above. Then, in the computer described above, the processors described above read the program described above from the recording medium and execute the read program, whereby the objective of the present invention is achieved. As the processor described above, for example, a central processing unit (CPU) may be used. As the recording medium described above, "a medium of a non-transitory type", for example, in addition to a read only memory (ROM) or the like, a tape, a disk, a card, a semiconductor memory, a programmable logic circuit, or the like may be used. In addition, a random access memory (RAM) or the like expanding the program described above may be further included. In addition, the program described above may be supplied to the computer described above through an arbitrary transmission medium (a communication network, a broadcast wave, or the like) that can transmit the program. Furthermore, one aspect of the present invention may be realized in the form of data signal embedded in a carrier wave in which the program described above is implemented through electronic transmission.

[Summing-Up]

According to one aspect of the present invention, there is provided a counter unit including: a measurement unit configured to measure an actually-measured value by counting a number of pulses of a pulse signal; a comparison unit configured to determine coincidence between the actually-measured value measured by the measurement unit and a target value; a time information processing unit configured to store a time corresponding to the actually-measured value in a buffer as target time information when the comparison unit determines that the actually-measured value and the target value coincide with each other; and an output unit configured to output a plurality of pieces of target time information stored in the buffer to an external device through communication with a predetermined communication period.

According to the configuration described above, for example, for an external device, position information based on an output from the counter unit and a measured value that is measured by another measurement device can be associated with each other using target time information corresponding to a target value. Here, by setting the target value to a degree for which necessary accuracy is acquired, a position and a measured value can be associated with each other with sufficient accuracy without being influenced by the communication period.

In addition, an output that is detailed more than necessary does not need to be performed from the counter unit, and thus the load of communication and the load of data processing in an external device can be reduced.

Furthermore, the counter unit outputs target time information corresponding to a target value, and thus occurrence of unevenness of measurement accuracy according to unevenness of the movement speed of a measurement target, which occurs conventionally in a case in which counter output is performed with a predetermined period, can be prevented.

The counter unit according to one aspect of the present invention may further include a target value storage unit configured to store a list of the target values, and the comparison unit may determine coincidence between the actually-measured value and the target value by referring to the target value storage unit.

According to the configuration described above, each target value can be appropriately set in accordance with necessary accuracy thereof. For example, in a case in which there are a position requiring high accuracy, a position that may have low accuracy, and the like, each target value can be set in accordance therewith.

In the counter unit according to one aspect of the present invention, the comparison unit may determine coincidence with the actually-measured value using the target values set at predetermined intervals.

According to the configuration described above, by setting an interval between target values in accordance with necessary accuracy, an output interval of the target time information with necessary accuracy can be set.

The counter unit according to one aspect of the present invention may further include a target value setting unit configured to accept a setting instruction for setting the target value.

According to the configuration described above, the setting of a target value can be appropriately changed in accordance with a measurement target.

According to one aspect of the present invention, there is provided a data processing device including: a time information receiving unit configured to receive the target time information from the counter unit described above; a measured value acquiring unit configured to acquire a measured value and measurement time information from a predetermined measurement device; and a measured value identifying unit configured to identify a measured value having the measurement time information that is within a predetermined range for a time represented by the target time information.

According to the configuration described above, a measured value corresponding to the target time information received from the counter unit can be identified, and thus measured values can be limited to a measurement value group of accuracy that is necessary and sufficient. Therefore, processes for measured values after that, the load of communication, and the like can be reduced.

The data processing device according to one aspect of the present invention may further include a determination unit configured to determine whether or not a difference between master data representing a correct answer value of the measured value that corresponds to the target value and the measured value identified by the measured value identifying unit is within an allowed range.

According to the configuration described above, presence/absence of a difference from the master data can be determined, and therefore, for example, the data processing device can be appropriately used for an inspection of the shape of a product and the like.

According to one aspect of the present invention, there is provided a measurement system including: the counter unit described above; the data processing device; and an analog input unit configured to transmit an output signal from a predetermined sensor as the measured value to the data processing device together with the measurement time information.

According to one aspect of the present invention, there is provided a counter unit control method including: a measuring step of measuring an actually-measured value by counting a number of pulses of a pulse signal; a comparing step of determining coincidence between the actually-measured value measured by the measuring step and a target value; a time information processing step of storing a time corresponding to the actually-measured value in a buffer as target time information when it is determined by the comparing step that the actually-measured value and the target value coincide with each other; and an output step of outputting a plurality of pieces of target time information stored in the buffer to an external device through communication with a predetermined communication period.

According to one aspect of the present invention, there is provided a data processing method including: a time information receiving step of receiving the target time information from the counter unit described above; a measured value acquiring step of acquiring a measured value and measurement time information from a predetermined measurement device; and a measured value identifying step of identifying a measured value having the measurement time information that is within a predetermined range for a time represented by the target time information.

The present invention is not limited to each of the embodiments described above, various modifications can be made in a range represented by the claims, and an embodiment acquired by appropriately combining technical means disclosed in different embodiments also belongs to the technical scope of the present invention.

The invention claimed is:

1. A counter unit comprising:
    a measurement unit configured to measure an actually-measured value by counting a number of pulses of a pulse signal;
    a comparison unit configured to determine coincidence between the actually-measured value measured by the measurement unit and a target value;
    a time information processing unit configured to store a time corresponding to the actually-measured value in a buffer as target time information when the comparison unit determines that the actually-measured value and the target value coincide with each other; and an output unit configured to output a plurality of pieces of target time information stored in the buffer to an external device through communication with a predetermined communication period.

2. The counter unit according to claim 1, further comprising a target value storage unit configured to store a list of the target values,
wherein the comparison unit determines coincidence between the actually-measured value and the target value by referring to the target value storage unit.

3. The counter unit according to claim 1, wherein the comparison unit determines coincidence with the actually-measured value using the target values set at a predetermined interval.

4. The counter unit according to claim 1, further comprising a target value setting unit configured to accept a setting instruction for setting the target value.

5. A data processing device comprising:
a time information receiving unit configured to receive the target time information from the counter unit according to claim 1;
a measured value acquiring unit configured to acquire a measured value and measurement time information from a predetermined measurement device; and
a measured value identifying unit configured to identify a measured value having the measurement time information that is within a predetermined range for a time represented by the target time information.

6. The data processing device according to claim 5, further comprising a determination unit configured to determine whether or not a difference between master data representing a correct answer value of the measured value that corresponds to the target value and the measured value identified by the measured value identifying unit is within an allowed range.

7. A measurement system comprising:
the counter unit according to claim 1;
a data processing device comprising:
  a time information receiving unit configured to receive the target time information from the counter unit;
  a measured value acquiring unit configured to acquire a measured value and measurement time information from a predetermined measurement device; and
  a measured value identifying unit configured to identify a measured value having the measurement time information that is within a predetermined range for a time represented by the target time information; and
an analog input unit configured to transmit an output signal from a predetermined sensor as the measured value to the data processing device together with the measurement time information.

8. A data processing method comprising:
a time information receiving step of receiving the target time information from the counter unit according to claim 1;
a measured value acquiring step of acquiring a measured value and measurement time information from a predetermined measurement device; and
a measured value identifying step of identifying a measured value having the measurement time information that is within a predetermined range for a time represented by the target time information.

9. The counter unit according to claim 2, further comprising a target value setting unit configured to accept a setting instruction for setting the target value.

10. The counter unit according to claim 3, further comprising a target value setting unit configured to accept a setting instruction for setting the target value.

11. A data processing device comprising:
a time information receiving unit configured to receive the target time information from the counter unit according to claim 2;
a measured value acquiring unit configured to acquire a measured value and measurement time information from a predetermined measurement device; and
a measured value identifying unit configured to identify a measured value having the measurement time information that is within a predetermined range for a time represented by the target time information.

12. A data processing device comprising:
a time information receiving unit configured to receive the target time information from the counter unit according to claim 3;
a measured value acquiring unit configured to acquire a measured value and measurement time information from a predetermined measurement device; and
a measured value identifying unit configured to identify a measured value having the measurement time information that is within a predetermined range for a time represented by the target time information.

13. A data processing device comprising:
a time information receiving unit configured to receive the target time information from the counter unit according to claim 4;
a measured value acquiring unit configured to acquire a measured value and measurement time information from a predetermined measurement device; and
a measured value identifying unit configured to identify a measured value having the measurement time information that is within a predetermined range for a time represented by the target time information.

14. A measurement system comprising:
the counter unit according to claim 2;
a data processing device comprising:
  a time information receiving unit configured to receive the target time information from the counter unit;
  a measured value acquiring unit configured to acquire a measured value and measurement time information from a predetermined measurement device; and
  a measured value identifying unit configured to identify a measured value having the measurement time information that is within a predetermined range for a time represented by the target time information; and
an analog input unit configured to transmit an output signal from a predetermined sensor as the measured value to the data processing device together with the measurement time information.

15. A measurement system comprising:
the counter unit according to claim 3;
a data processing device comprising:
  a time information receiving unit configured to receive the target time information from the counter unit;
  a measured value acquiring unit configured to acquire a measured value and measurement time information from a predetermined measurement device; and
  a measured value identifying unit configured to identify a measured value having the measurement time information that is within a predetermined range for a time represented by the target time information; and an analog input unit configured to transmit an output signal from a predetermined sensor as the measured value to the data processing device together with the measurement time information.

16. A measurement system comprising:
the counter unit according to claim 4;
a data processing device comprising:
   a time information receiving unit configured to receive the target time information from the counter unit;
   a measured value acquiring unit configured to acquire a measured value and measurement time information from a predetermined measurement device; and
   a measured value identifying unit configured to identify a measured value having the measurement time information that is within a predetermined range for a time represented by the target time information; and
an analog input unit configured to transmit an output signal from a predetermined sensor as the measured value to the data processing device together with the measurement time information.

17. A data processing method comprising:
a time information receiving step of receiving the target time information from the counter unit according to claim 2;
a measured value acquiring step of acquiring a measured value and measurement time information from a predetermined measurement device; and
a measured value identifying step of identifying a measured value having the measurement time information that is within a predetermined range for a time represented by the target time information.

18. A data processing method comprising:
a time information receiving step of receiving the target time information from the counter unit according to claim 3;
a measured value acquiring step of acquiring a measured value and measurement time information from a predetermined measurement device; and
a measured value identifying step of identifying a measured value having the measurement time information that is within a predetermined range for a time represented by the target time information.

19. A data processing method comprising:
a time information receiving step of receiving the target time information from the counter unit according to claim 4;
a measured value acquiring step of acquiring a measured value and measurement time information from a predetermined measurement device; and
a measured value identifying step of identifying a measured value having the measurement time information that is within a predetermined range for a time represented by the target time information.

20. A counter unit control method comprising:
a measuring step of measuring an actually-measured value by counting a number of pulses of a pulse signal;
a comparing step of determining coincidence between the actually-measured value measured by the measuring step and a target value;
a time information processing step of storing a time corresponding to the actually-measured value in a buffer as target time information when it is determined by the comparing step that the actually-measured value and the target value coincide with each other; and
an output step of outputting a plurality of pieces of target time information stored in the buffer to an external device through communication with a predetermined communication period.

* * * * *